US008463822B2

(12) United States Patent
Li et al.

(10) Patent No.: US 8,463,822 B2
(45) Date of Patent: Jun. 11, 2013

(54) DATA MERGING IN DISTRIBUTED COMPUTING

(75) Inventors: Jianghua Li, Hangzhou (CN); Weixun Wu, Hangzhou (CN); Song Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 232 days.

(21) Appl. No.: 12/158,689

(22) PCT Filed: Mar. 28, 2008

(86) PCT No.: PCT/US2008/058732
§ 371 (c)(1),
(2), (4) Date: Dec. 14, 2009

(87) PCT Pub. No.: WO2008/121862
PCT Pub. Date: Oct. 9, 2008

(65) Prior Publication Data
US 2010/0223297 A1    Sep. 2, 2010

(30) Foreign Application Priority Data
Mar. 30, 2007  (CN) .......................... 2007 1 0090995

(51) Int. Cl.
*G06F 17/30*      (2006.01)
(52) U.S. Cl.
USPC ............................ 707/802; 707/803; 707/804
(58) Field of Classification Search
USPC ......................... 707/802, 803, 804
See application file for complete search history.

(56) References Cited

U.S. PATENT DOCUMENTS

| 5,909,542 | A | 6/1999 | Paquette et al. | |
|---|---|---|---|---|
| 5,996,012 | A | 11/1999 | Jarriel | |
| 6,092,213 | A * | 7/2000 | Lennie et al. | 714/3 |
| 6,167,431 | A | 12/2000 | Gillies et al. | |
| 6,728,704 | B2 * | 4/2004 | Mao et al. | 1/1 |
| 6,879,984 | B2 * | 4/2005 | Duddleson et al. | 1/1 |
| 6,917,929 | B2 * | 7/2005 | Teloh et al. | 1/1 |

(Continued)

FOREIGN PATENT DOCUMENTS

| CN | 1149797 A | 5/1997 |
|---|---|---|
| CN | 1461438 A | 12/2003 |
| WO | WO2004084095 | 9/2004 |

OTHER PUBLICATIONS

Kevin Loney, Oracle Database 10g: The Complete Reference (2004), published by Oracle Press.*

(Continued)

*Primary Examiner* — Thanh-Ha Dang
(74) *Attorney, Agent, or Firm* — Lee & Hayes, PLLC

(57) ABSTRACT

A data merging method for distributed computing uses a configuration file to guide the insertion of computational results obtained by distributed nodes into a database table, and to merge the computational results inserted in the database table. The configuration file is established according to the task splitting conditions of distributed computing. The method uses a data merging server to import and host the configuration file and create a database table corresponding to the configuration file. Each distributed node inserting its distributed computational result into the database table after completing the respective distributed computing task, while the data merging server merges the data in the database table. An interface standard applicable to various uses and various distributed computing tasks may be used such that the user only needs to establish a job-specific configuration file based on the interface standard.

16 Claims, 4 Drawing Sheets

U.S. PATENT DOCUMENTS

| | | | |
|---|---|---|---|
| 6,947,986 | B1 | 9/2005 | Huang et al. |
| 7,171,672 | B2 | 1/2007 | Just |
| 7,240,059 | B2 | 7/2007 | Bayliss et al. |
| 7,412,494 | B2* | 8/2008 | Dittrich et al. ............. 709/217 |
| 7,624,163 | B2 | 11/2009 | Kramer |
| 8,386,469 | B2* | 2/2013 | Reuther et al. ............. 707/715 |
| 2001/0014888 | A1* | 8/2001 | Tsuchida et al. ............. 707/2 |
| 2002/0019864 | A1 | 2/2002 | Mayer |
| 2003/0018699 | A1 | 1/2003 | Matthews et al. |
| 2003/0177064 | A1* | 9/2003 | Emura ............. 705/14 |
| 2003/0191743 | A1 | 10/2003 | Brodersen et al. |
| 2004/0030703 | A1 | 2/2004 | Bourbonnais et al. |
| 2005/0102311 | A1* | 5/2005 | Rollins ............. 707/102 |
| 2006/0195420 | A1* | 8/2006 | Kilroy ............. 707/3 |
| 2006/0195608 | A1 | 8/2006 | Tanaka et al. |
| 2012/0265744 | A1* | 10/2012 | Berkowitz et al. ............. 707/705 |

OTHER PUBLICATIONS

Kevin Loney, Oracle Database 10g: The Complete Reference (2004), published by Oracle Press (pp. 413-418, and 720-724).*

Kevin Loney, Oracle Database 10g: The Complete Reference (2004), published by Oracle Press (pp. 392-395, 397, 400, 413-414, 720).*

The Extended European Search Report mailed Jul. 5, 2012 for European patent application No. 08744662.1, 7 pages.

Translated Japanese Office Action mailed Oct. 5, 2012 for Japanese patent application No. 2010-501266, a counterpart foreign application of U.S. Appl. No. 12/158,689, 4 pages.

* cited by examiner

DATA MERGING IN DISTRIBUTED COMPUTING

RELATED APPLICATIONS

This application is a national stage application of international patent application PCT/US08/58732, filed Mar. 28, 2008, claiming priority from Chinese patent application, Application No. 200710090995.5, filed Mar. 30, 2007, entitled "METHOD, SYSTEM AND APPARATUS FOR DATA MERGING IN DISTRIBUTED COMPUTING".

BACKGROUND

This disclosure is related to the field of network communication technologies in general, and data merging of distributed computing in particular.

As the internet technologies develop at a very fast pace, processing the tremendous amount of information that exists on the internet has become a difficult problem. If a single computer is used for processing a large amount of data, the computer is required to have very powerful processing abilities and port capabilities. However, not only are high performance single-unit computers very expensive, the processing methods that reply on a single computer are also very limited. In order to increase the processing abilities of computational task systems, distributed computing is used to divide a large problem into many small problems which are distributed to many computers. Distributed computing is a method of computer processing in which different parts of a program are run simultaneously on two or more computers that are communicating with each other over a network. Distributed computing can exploit idle resources of many interconnected computers on the Internet to process the large amount of information on the Internet.

In distributed computing, a project data that requires lots of computation is split into many small pieces, which are separately computed by many different computers. These different computers, called distributed nodes, send the distributed computational results back to a central computer. Upon uploading the distributed computational results, the central computer merges the results to obtain the final data or a solution. Accordingly, distributed computing usually consists of several components, including components for task splitting, task computation and result merging. For task splitting, different methods are used to split the task depending on the nature of the application. The goal is usually to achieve even task division while keeping each task unrelated with each other at the same time. After task splitting, tasks are assigned to different distributed nodes. For task computation, each distributed node performs corresponding distributed computation to obtain a computational result of a distributed subtask. For result merging, processing results of different distributed nodes are merged in a server computer to obtain a final processing result.

In the current distributed computing technology, the processing methods for different applications are different. To process an application, the user must consider the details such as concurrent processing, fault-tolerance and load balance in distributed computing. As a result, the coding may become very complicated. Take an analysis of an access path for the web sites visited by Internet users as an example. This task requires writing the codes for task splitting, access path analysis and result merging. Within these codes, the program is also required to process data synchronization, concurrency, fault-tolerance and load. The coding for distributed computing is usually application-specific. For a new application, all these processes may have to be repeated, together with the consideration of the problems such as task splitting, result merging and data synchronization. This creates a burdensome environment for implementing distributed computing.

SUMMARY

This disclosure describes a method and a system of data merging in distributed computing. Using the disclosed method and system, data merging in distributed computing may only take a few steps to complete, and hence reduce the user workload.

A data merging method for distributed computing uses a configuration file to guide the insertion of computational results obtained by distributed nodes into a database table, and to merge the computational results inserted in the database table. The configuration file is established according to the task splitting conditions of distributed computing. The method uses a data merging server to import and host the configuration file and create a database table corresponding to the configuration file. Each distributed node inserts its distributed computational result into the database table after completing the respective distributed computing task, while the data merging server merges the data in the database table. An interface standard applicable to various uses and various distributed computing tasks may be used such that the user only needs to establish a job-specific configuration file based on the interface standard. The system may be configured to automatically merge the data. The disclosed method and system hide the details of data merging in distributed computing and streamlines the procedure.

One aspect of this disclosure describes a data merging method for distributed computing which first provides a configuration file to a data merging server. The configuration file is set up according to task splitting conditions of distributed computing. The data merging server creates a database table according to the configuration file. After completing their respective distributed computer tasks, the distributed nodes return distributed computational results, which are inserted into the database table. The data merger server then merges data in the database table. The configuration file may contain information specifying items such as the name of the database table for data merging, names of database table fields, the data insertion method to be used and the data merging method to be used. The configuration file facilitates data insertion and data merging. For example, the computational result data may be inserted into the database table according to the name of the database table for data merging. For merging the data in the database table, the data merging server may process the fields in the database according to the merging method specified in the configuration file. The configuration file may further specify a maximum number of records, an error handling method, a maximum number of incorrect records and a record storage method.

In some embodiments, the distributed computational result data contains a distributed task ID, a distributed configuration item name and a distributed computational result. The multiple data entries in the distributed computational result data may be separated from each other by an ASCII code.

One embodiment of the data merger method establishes an interface standard for importing and parsing the configuration file and/or inserting the computational result data into the database table. The interface standard may be extendable by a user.

Another aspect of this disclosure describes a distributed computing data merging system. The data merging server is configured to create a database table according to a configuration file, receive and insert respective computational result data into the database table from a distributed node after the distributed node has completed a respective distributed task, and merge data in the database table after each distributed node has reported the respective computational result data. In one embodiment, the data merging server has a database table creation module and a data merging module. The database table creation module is used to create a database table according to the configuration file. The data merging module is used to merge data in the database table after each distributed node has reported its respective computational result data. The data merging server may also have a computational result statistics module for determining whether all distributed nodes have reported their respective computational result data. The data merging server may also have an intermediary data storage module used to store the database table before data merging.

Another aspect of the disclosure describes a data merging server which includes a database table creation module and a data merging module. The database table creation module is used for creating a database table according to a configuration file, where the database table is configured for receiving and inserting distributed computational result data recorder from distributed nodes. The data merging module is used for merging data in the database table according to the configuration file after each distributed node has reported its respective computational result data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

In the present description, a configuration files, or a config file, is a computer file used to configure the initial settings for some computer programs. A configuration file may be used for user applications, server processes and operating system settings. The files may be written in any suitable code such as ASCII and UTF-8 and may be line-oriented, with lines terminated by a newline or carriage return/line feed pair, depending on the operating system.

A database table is a set of data elements (values) organized using a model of horizontal rows and vertical columns. One example of a database table has columns identified by names, and the rows identified by the values appearing in a particular column subset which has been identified as a candidate key. In relational databases and flat file databases, a table is another term for relations. A table usually has a specified number of columns but can have any number of rows. Besides the actual data rows, a table may also have associated with it some meta-information, such as constraints on the table or on the values within particular columns. The data in a table may be but do not have to be physically stored in a database.

The data merging method and system are further described below using exemplary embodiments as illustrations. The exemplary embodiments described herein use a database as a platform to encapsulate specific details of data merging of distributed computing. Some embodiments have the benefit of a simplified data merging procedure. A user of the described data merger method and system only needs to write a job-specific configuration file based on a predefined interface standard. Once the data is imported, the system merges the data automatically. Only a few simple steps are needed to complete a job that previously may require several hundred lines of codes.

Figure 1:
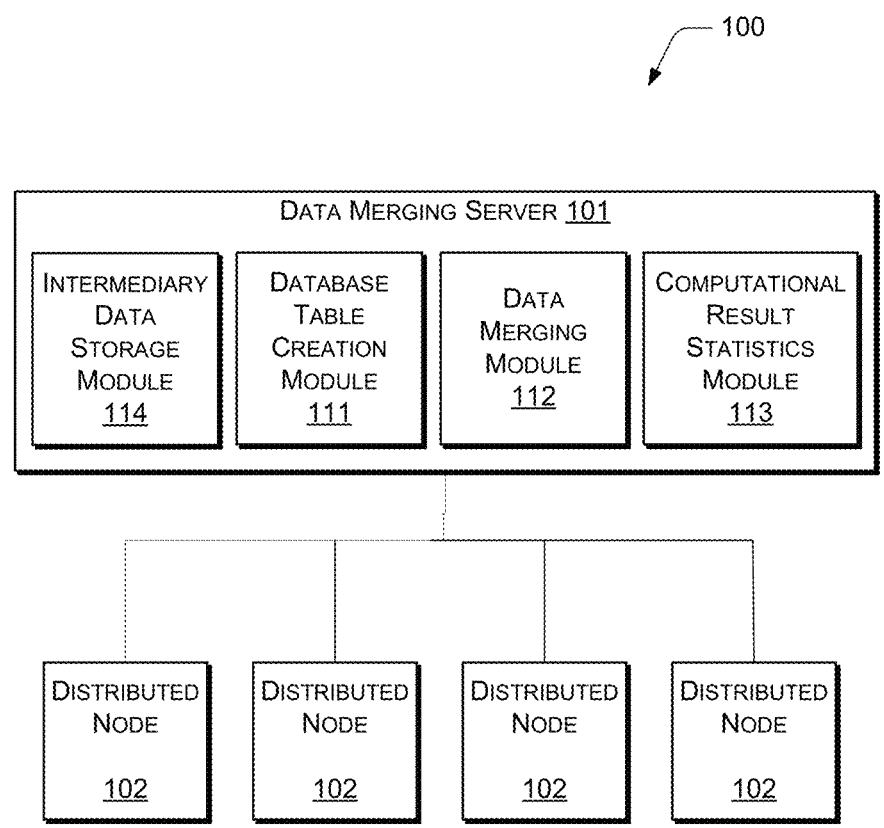
FIG. 1 shows a block diagram of an exemplary distributed computing data merging system in accordance with the present disclosure.

FIG. 1 shows a block diagram of an exemplary distributed computing data merging system in accordance with the present disclosure. The distributed computing data merging system 100 includes a data merging server 101 and at least one distributed node 102. The data merging server 101 creates a database table according to a configuration file, which may be set up by a user who intends to use the distributed computing data merging system 100 to carry out a certain distributed computing operation. One example of such distributed computing operation is processing website access data collection and statistics.

In this description, the user of the distributed computing data merging system may either have direct access to the data merging server 101 to set up the configuration file on the data merging server 101, or set up the configuration file separately and upload it to the data merging server 101. The database table created according to the configuration file has a corresponding relationship to that configuration file, as further illustrated herein.

The data merging server 101 merges data in the database table after each distributed node 102 has reported its respective computational result data. To this end, each distributed node 102 first carries out the assigned distributed compute additional task to obtain a respective computational result and report the computational result as part of the computational result data to the data merging server 101 after completing its respective distributed computational task. The reported computational result data is then inserted into the database table in the data merging server 101. The insertion of the computational result data into a database table may be done by the data merging server 101, or by the respective distributed node 102 through a proper interface. In this description, the distributed node 102 is often said to insert its computational result data into the database table. Such characterization is for the purpose of illustration only, and does not exclude a configuration where the distributed node 102 simply sends its computational result data to the data merging server 101 and leaves the computational result data to be inserted by the data merging server 101, or by another suitable device or component.

An exemplary process of merging computational result through this distributed computing data merging system is described as follows.

In one embodiment, a standard for data merging interface is set up based on the methods that are used for the data merging process. This standard is used to standardize (normalize) different applications and operations of distributed computing. Using this standard, users of the distributed computing data merging system can process different applications of distributed computing without requiring writing codes for different applications repeatedly. Instead, a user writes a job-specific configuration file for a particular application according to the standard. This configuration file is set up based on the conditions of task splitting and task computing procedures of the distributed computing. The configuration file may contain information that specifies a database table name (the name of the database used for data merging), field names, a data insertion method and a merging method, which are all set up according to the conditions of task splitting of the distributed computing. The configuration file may also include information that specifies the maximum number of records, an error handling method, the maximum number of incorrect records and a record storage method.

In this description, the data insertion method refers to the method of inserting data into database. The insertion can be direct or indirect. The insertion of the data may be done by the distributed node through a proper interface, or by another component such as the data merging server 101 itself. The record storage method refers to the form of the output data for storage used, which can be in the form of a database, a remote network file or a file in local disk. The configuration file can also be expanded by the user to include more items of a same kind or to specify other types of items if necessary.

The data merging server 101 reads the configuration file, and parses the configuration file according to the standard of the data merging interface. By parsing the configuration file, the data merging server 101 obtains user configured information such as database table name, field names, data insertion method and merging method, maximum number of records, error handling method, maximum number of incorrect records and record storage method. The data merging server 101 uses a database contained therein (or accessible) to create a database table according to this information, and names the created database table with the user configured database table name. The data merging server 101 also records the user configured data merging method.

After the completion of distributed computing task, each distributed node 102 reports to the data merging server 101 the respective computational result data to be inserted into the database table. In one embodiment, the distributed node 102 automatically calls a data merging interface in accordance with the present data merging method to insert the respective computational result data into the database table. The computational result data may include a distributed task ID, a distributed configuration item name and a computational result. Separation of the parts (such as the illustrated items including the distributed task ID, etc.) of the computational result data may be achieved using ASCII code, such as using \5 as a separator.

After all distributed nodes 102 have reported their respective computational result data, the data merging server 101 then merges the database table according to the user configured data merging method previously recorded. This merging operation may be achieved by using a database contained in or accessible by the data merging server 101. After the completion of the merging operation, the data merging server 101 exports a final merging result in the forms of a database table, a remote network file or a file in local disk, according to the record storage method specified by the user configuration file.

User can choose any merging operation supported by the database to be carried out during data merging. Examples of merging operations are grouping a particular field in the database table, summing up the values of a particular field, and finding a maximum value in a particular field.

As shown in FIG. 1, the data merging server 101 has a database table creation module 111 and a data merging module 112. The database table creation module 111 is used to create a database table according to the configuration file set up by user. The database table thus created has a corresponding relationship to that configuration file. The data merging module 112 is used to merge data in the database table after each distributed node 102 has reported its respective computational result data.

The data merging server 101 may also have a computational result statistics module 113 and an intermediary data storage module 114. The computational result statistics module 113 determines whether all distributed nodes 102 have reported their respective computational result data. The intermediary data storage module 114 is used to store database table before data merging.

Figure 2:
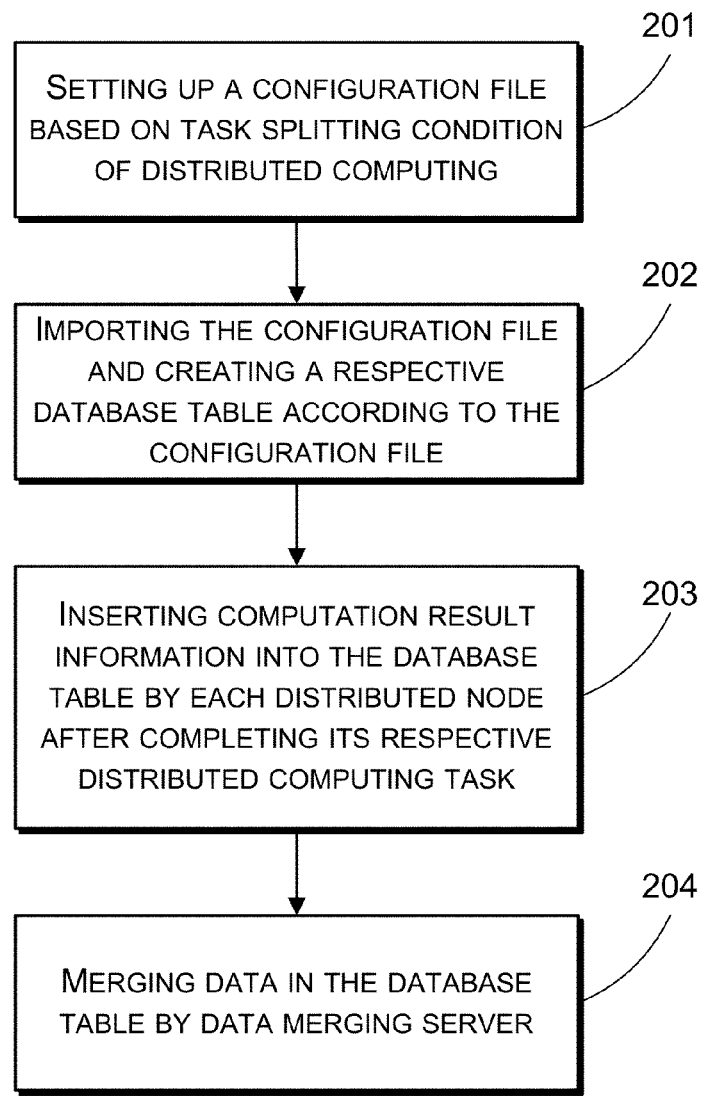
FIG. 2 shows a flowchart of an exemplary data merging method for distributed computing in accordance with the present disclosure.

FIG. 2 shows a flowchart of an exemplary data merging method for distributed computing in accordance with the present disclosure. In this description, the order in which a process is described is not intended to be construed as a limitation, and any number of the described process blocks may be combined in any order to implement the method, or an alternate method. The process is described as follows.

At block 201, a configuration file is set up according to the conditions of task splitting of the distributed computing. The configuration file is set up based on the conditions of task splitting and task computing procedures of the distributed computing. The configuration file may specify a database table name, field names, a data insertion method and a merging method. The configuration file may also further specify a maximum number of records, an error handling method, a maximum number of incorrect records and a record storage method. The configuration file can be expanded if necessary. The data insertion method refers to the method of inserting data into database. The insertion can be direct or indirect. The record storage method refers to the form of the output data for storage, which can be in the form of a database, a remote network file or a file in local disk.

At block 202, the configuration file is provided to a data merging server (e.g., data merging server 101), which uses the provided configuration file to create a database table. In one embodiment, the configuration file set up at block 201 is imported to the data merging server which creates a database table corresponding to the configuration file. To do this, the data merging server reads the configuration file and parses the information in the configuration file according to a standard data merging interface. By parsing the configuration file, the data merging server obtains user configured information such as the database table name used for data merging, the field names, the data insertion method and the merging method, the maximum number of records, the error handling method, the maximum number of incorrect records and the record storage method. The data merging server then uses a database to create a database table according to the obtained information, and names the database table with the user configured database table name. The data merging server also records the user configured data merging method for later use.

At block 203, each distributed mode inserts its respective computational result data into the database table after completing distributed computing task. To accomplish this, each distributed node may use the standard interface provided to automatically insert computational result data into the database table after the completion of distributed computing task. The computational result data may include information of a distributed task ID, a distributed configuration item name and a computational result. Separation between parts of the computational result data is achieved using ASCII code(s), such as using \5 as a separator.

At block 204, the data merging server merges the data in the database table. The data merging server merges the database table according to the user configured data merging method previously recorded at block 202. This merging operation is achieved by using a database in the illustrated embodiment. After the merging operation is completed, the data merging server exports a final merging result in the form of a database table, a remote network file or a file in local disk to be stored, according to the user configuration file. In the data merging process, user can choose any merging operation supported by the database. Examples of merging operations are grouping a particular field in the database table, summing up the values of a particular field, and finding a maximum in a particular field.

Figure 3:
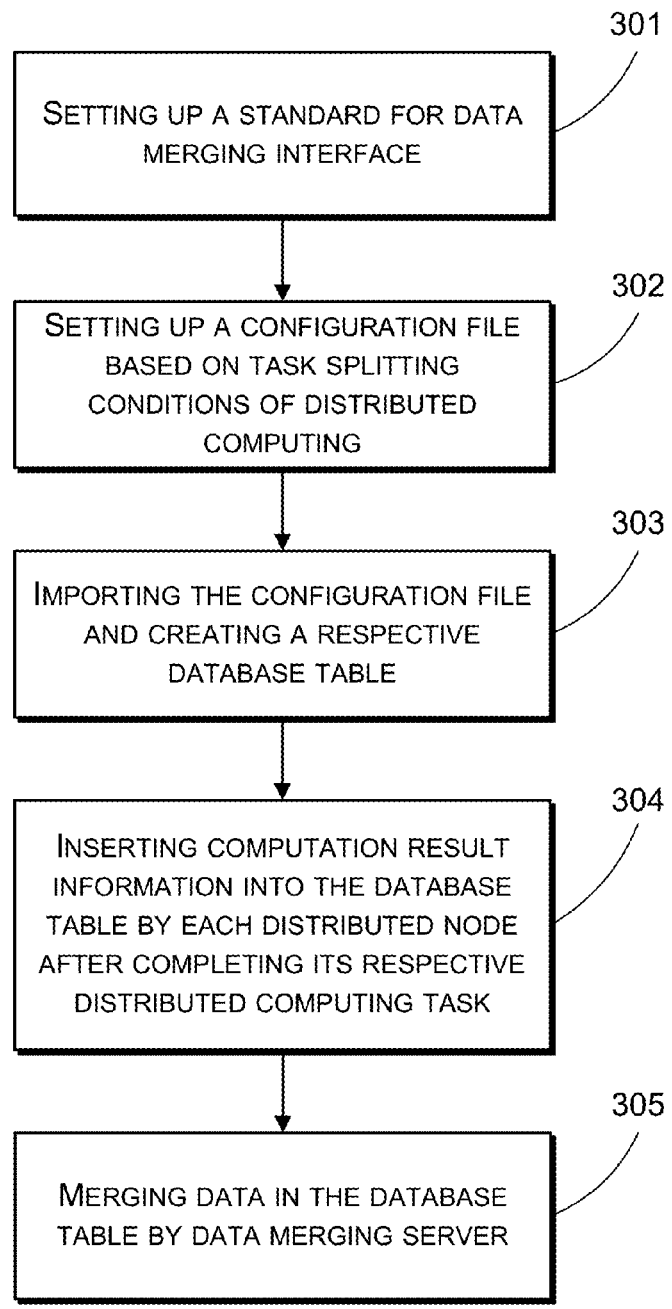
FIG. 3 shows a flowchart of another exemplary data merging method for distributed computing in accordance with the present disclosure.

FIG. 3 shows a flowchart of another exemplary data merging method for distributed computing in accordance with the present disclosure. The process is described as follows.

At block 301, a standard of data merging interface is set up based on the methods that are used for merging process. This data merging interface standard standardizes (normalizes) different applications of distributed computing under a uniform framework. Using the standard, users can process different applications of distributed computing under the same framework of data merging, and do not require writing codes for different applications repeatedly. This standard is not mandatory for the data merging method for distributed computing disclosed herein. However, by setting the standard, the exemplary embodiment can advantageously standardize various applications of distributed computing.

The standard can be implemented as a standard format of the configuration file. An example of such standard configuration file is illustrated below.

create mergedata table_name

```
(
    field1_name field1_type field1_class,
    field2_name field2_type field2_class
)
[limit n]
[maxerror n]
[directload]
[globalfile/localfile]
```

In the above, the terms field1 and field2 are fields which are set up according to the task splitting condition before data merging of distributed computing. The term "limit" refers to the maximum number (of records) after the records are arranged in the descending order. The term "maxerror" refers to the maximum number of incorrect records allowed to be inserted in the database. The term "directload" indicates the method of data insertion into database, which in the exemplary case is direct insertion. The method of data insertion may be direct insertion or indirect insertion. Globalfile/localfile indicates the method of record storage, which in the exemplary case is in the form of a file (either global file or local file). The method of record storage can be in the form of database or a file, which can be either Globalfile (remote network file) or localfile (file in local disk). In the exemplary embodiment, the standard of the data merging interface can also be expanded according to user requirements. For example, the number of fields in the configuration file may be expanded to include more fields according to the user needs. The standard may also be extended to include other specifications.

At block 302, a configuration file is set up according to the condition of task splitting of distributed computing. Illustrated below is an exemplary configuration file set up by a user based on the user requirements.

```
CREATE mergedata ANALOG_RES_SUMMARY_DAILY
(
    PROFILE_ID        NUMBER    key,
    REPORT_TIME       NUMBER    key,
    PAGEVIEW          NUMBER    order,
    VISITS            NUMBER    order,
    AVER_VISIT_LEN    NUMBER    order,
    UNIQ_VISITOR      NUMBER    order,
    VISIT1_VISITOR    NUMBER    order,
    PAGEVIEW1_VISIT   NUMBER    order
)
limit 1
maxerror 1
directload
localfile;
```

The above exemplary configuration file is a specific embodiment of the standard configuration file illustrated above having eight different fields (PROFILE_ID; REPORT_ TIME; PAGEVIEW; VISITS; AVER_VISIT_LEN; UNIQ_VISITOR; VISIT1_VISITOR; PAGEVIEW1_VISIT).

At block 303, a data merging server imports the configuration file and creates a database table corresponding to the configuration file. The data merging server reads the configuration file and parses the configuration file according to the standard of the data merging interface. By parsing the configuration file, the data merging server obtains user configured information such as a database table name used for data merging, field names, a data insertion method and a merging method, a maximum number of records, an error handling method, a maximum number of incorrect records and a record storage method. The data merging server then uses a database to create a database table according to this information, and names the database table with the user configured database table name. The data merging server also records the user configured data merging method for later use.

From the above illustrated exemplary configuration file set up by the user according to the user requirements, the following configuration information is obtained:

(i) According to the task splitting condition specified in the configuration file, the task computational result should have eight fields, which are profile_id, report_time, pageview, visits, aver_visit_len, uniq_visitor, visit1_visitor and pageview1_visit.

(ii) There is no limit to the number of records.

(iii) The maximum number of incorrect records allowed is one.

(iv) Direct insertion method is to be used for importing data.

(v) The database table name is ANALOG_RES_SUMMARY_DAILY.

(vi) The final merging result is to be exported in the form of a local disk file.

According to the above exemplary standard, in the user-configured configuration file, Field1_class or Field2_class indicates the merging method. In this example, the field_class of profile_id and report_time are "key" while the field_class for the rest of the fields are "order". This specifies a data merging method. Specifically, the data merging process is to use profile_id and report_time as key words to identify data related to the same profile ID and report time, and compute the sums of each of the other fields (page_view, visits, aver_visit_len, uniq_visitor, visit1_visitor and pageview1_visit) that are thus identified.

Based on the above information obtained from the configuration file, the data merging server calls a database to create thereupon a database table that includes the above information. The data merging server also stores the described merging method for later use.

At block 304, each distributed mode inserts its respective computational result data into the database table after completing its distributed computing task. Specifically, after the completion of distributed computing task, each distributed node automatically uses the standard interface provided to insert the respective computational result data into the database table. The computational result data may include user configured information such as the name of the database table into which the computational result is inserted and the computational result. Separation between each part of this computational result data is achieved using ASCII code.

For instance, the reported computational data may specify a database table name called ANALOG_RES_SUMMARY_DAILY, and include a data to be inserted "2\520070214\5100\550\523\524\512\548". The inserted data contains separate data blocks each corresponding to a field as specified in the configuration file. The data blocks are separated using ASCII code 5 as a separator. In the example illustrated herein, the inserted data are: profile_id=2, report_time=20070214, pageview=100, visits=50, aver_visit_len=23, uniq_visitor=24, visit1_visitor=12, and pageview1_visit=48.

At block 305, the data merging server merges the data in the database table. The merging method as specified in the exemplary configuration file indicates that each of the fields page_view, visits, aver_visit_len, uniq_visitor, visit1_visitor and pageview1_visit is to be merged when the respective profile_id and report_time are the same. For example, all page_view in the computational result data provided by distributed nodes are to be merged (summed up) if they have the same profile_id and report_time. Likewise, all visits in the computational result data provided by distributed nodes are to be merged (summed up) if they have the same profile_id and report_time, and so on. Accordingly, the data merging server uses the database to merge the data according to the above merging method, and exports the merging result as a local disk file for storage.

The exemplary embodiments of the data merging method and system illustrated herein hides the details of data merging in distributed computing by automatic data merging using a data merging server and distributed nodes. This alleviates the workload of the user of distributed computing. As a result, users do not need to understand the details of the data merging in distributed computing and further have no need to write job-specific codes for each different application. Using the exemplary embodiments of the data merging method and system, only a few simple steps are required to complete the job that previously requires several hundred lines of codes.

Implementation Environment

The above-described techniques may be implemented with the help of a computing device, such as a server or a personal computer (PC) having a computing unit.

Figure 4:
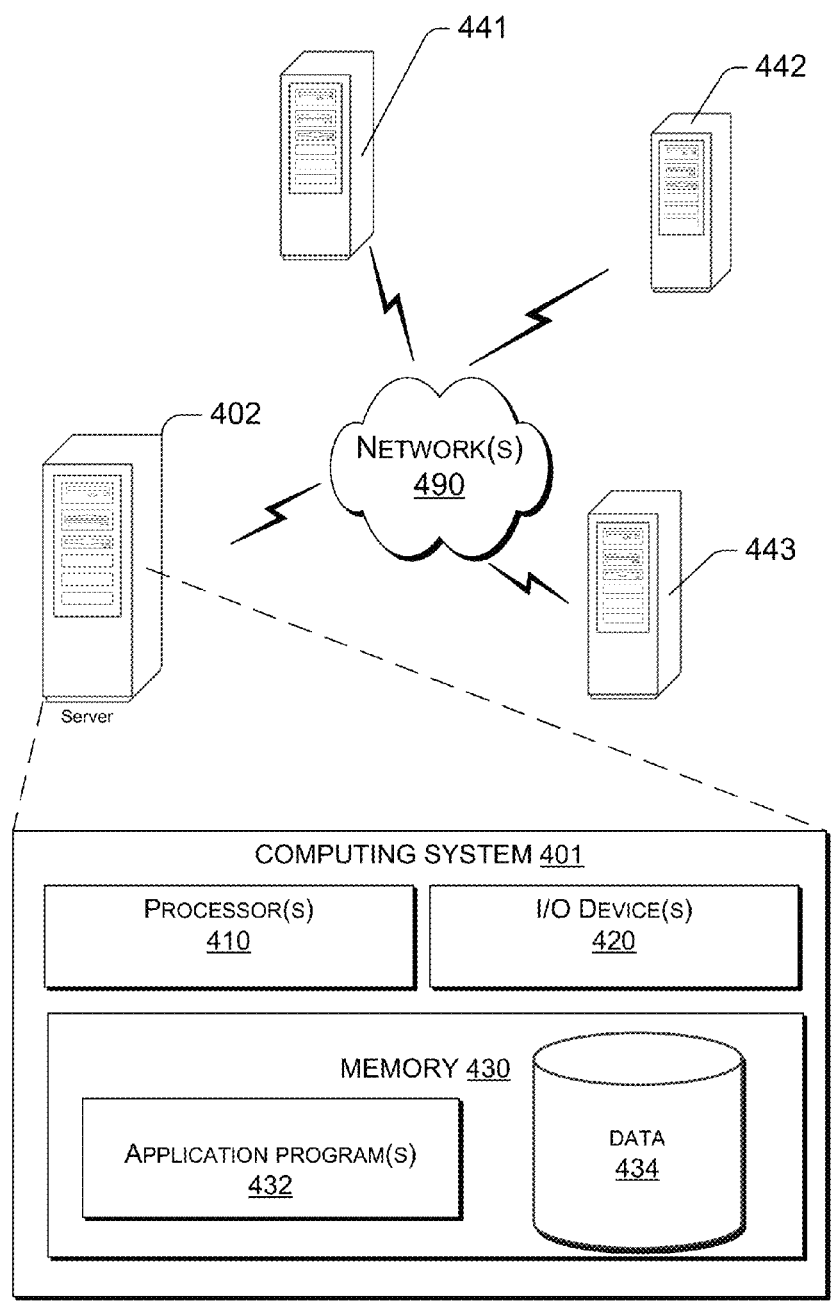
FIG. 4 shows an exemplary environment for implementing the data merging method of the present disclosure.

FIG. 4 shows an exemplary environment for implementing the method of the present disclosure. Computing system 401 is implemented with computing device 402 which includes processor(s) 410, I/O devices 420, computer readable media (e.g., memory) 430, and network interface (not shown). Other computing devices such as 441, 442 and 443 may have similar components. The computer device 402 is connected to computing devices 441, 442 and 443 through network(s) 490. Computing device 402 is a server used as a data merging server described herein, while computing devices 441, 442 and 443 may each be used as a distributed node as described herein.

The computer readable media 430 stores application program modules 432 and data 434 (such as configuration file, database table and database). Application program modules 432 contain instructions which, when executed by processor(s) 410, cause the processor(s) 410 to perform actions of a process described herein (e.g., certain actions in the processes of FIGS. 2-3).

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. Especially, each computer device 402, 441, 442 and 443 may be a server computer, or a cluster of such server computers, connected through network(s) 490, which may either be Internet or an intranet. The present disclosed distributed computing system thus configured may be used to handle a variety of computational tasks, including being used as part of an e-commerce system used for processing online commercial transactions.

The present distributed task system and distributed task management method can be used in combination with any existing distributed task system and method. For example, Remote Procedure Call (RPC) may be used in combination with the present disclosed techniques. RPC allows a computer program to cause a subroutine or procedure to execute in another address space (commonly on another computer on a shared network) without the programmer explicitly coding the details for this remote interaction.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of merging data for distributed computing, the method comprising:
under control of one or more computer systems configured with executable instructions,
parsing by a data merging server a configuration file using a predetermined interface standard that normalizes different applications processed by the distributed computing, the configuration file including a data insertion method and a data merge method;
creating by the data merging server a database table for data merging according to the configuration file;

receiving, from multiple distributed nodes, distributed computational result data corresponding to distributed computing tasks;

inserting individual data block of multiple data blocks that are included in the distributed computational result data into a corresponding field of the database table based on the data insertion method;

identifying certain data of the received distributed computational result data; and merging the certain data in the database table based on the data merge method by:
grouping multiple distributed computational results included in the distributed computational result data that have a same profile ID and a same reporting time in the database table, and
computing a sum of values of the grouped multiple distributed results.

2. The method as recited in claim 1, further comprising: exporting a data merging result as a database or a file after the data merging server has merged the distributed computational result data in the database table.

3. The method as recited in claim 1, wherein the identifying of the certain data of the received distributed computational result data comprises identifying according to the profile ID and the reporting time associated with each set of the certain data corresponding to each of the multiple distributed nodes.

4. The method as recited in claim 1, wherein the configuration file further includes:
a maximum number of records, an error handling method, a maximum number of incorrect records and a record storage method.

5. The method as recited in claim 1, wherein the inserting the distributed computational result data into the database table comprises one of inserting by the distributed nodes or inserting by the data merging server the distributed computational result data into the database table according to a name of the database table.

6. The method as recited in claim 1, wherein the distributed computational result data comprises a distributed task ID, a distributed configuration item name and a distributed computational result.

7. The method as recited in claim 6, wherein the distributed computational result data comprises multiple data blocks separated from each other by an ASCII code.

8. The method as recited in claim 1, further comprising: establishing an interface standard for importing and parsing the configuration file.

9. The method as recited in claim 8, wherein the interface standard is extended by a user.

10. The method as recited in claim 1, wherein the configuration file includes information relating to a maximum number of records, an error handling method, a maximum of incorrect records, and a record storage method.

11. A distributed computing data merging system, comprising:
a data merging server configured to:
create a database table according to a configuration file that includes task splitting condition of distributed computing, information relating to database table fields that include a profile ID field and a reporting time field, information associated with a database table for data merging, data insertion method information and data merging method information, the configuration file being specified according to a predetermined standard such that different applications of the distributed computing are processed without application-specific coding,
insert distributed computational result data into the database table respectively based on data insertion method information including a parameter indicating whether the distributed computational result data is loaded directly into the database table or is inserted into the database table indirectly through an interface, the distributed computational result data being respectively corresponding to distributed computing tasks specified in the task splitting condition of distributed computing,
identify certain data of the distributed computational result data by processing the profile ID field and the reporting time field, the certain data being associated with the profile ID and the report time included in the database table fields, and
merge the certain data in the database table; and
at least one distributed node configured to report the corresponding distributed computational result data to the data merging server.

12. The distributed computing data merging system as recited in claim 11, wherein the data merging server further comprises:
a computational result statistics module configured to determine whether the at least one distributed node has reported the corresponding distributed computational result data to the data merging server.

13. The distributed computing data merging system as recited in claim 11, wherein the data merging server further comprises:
an intermediary data storage module for storing the database table before merging data.

14. The distributed computing data merging system as recited claim 11, wherein the data merging server is configured to use an interface standard for importing and parsing the configuration file.

15. The distributed computing data merging system as recited in claim 14, wherein the interface standard is extended by a user.

16. A data merging server for distributed computing, comprising:
memory;
at least one processor coupled to the memory;
a standard data merging interface, stored in the memory and executable on the at least one processor, to:
receive a configuration file from multiple distributed nodes, and
parse the configuration file to obtain task splitting condition of distributed computing, information associated with a database table for data merging, data insertion method information and data merging method information included in the configuration file;
a database table creation module, stored in the memory and executable on the at least one processor, to create a database table according to the information associated with a database table for data merging included in the configuration file;
a data merging module, stored in the memory and executable on the at least one processor, to:
identify each of distributed computing tasks specified in the task splitting condition of distributed computing according to a profile ID and a reporting time included in the configuration file,
determine that the multiple distributed nodes have completed the distributed tasks,
automatically insert into the database table distributed computational result data corresponding to the each of the distributed computing tasks according to the data insertion method information included in the configuration file, and merge the distributed computational result data in the database table by:

grouping multiple computational results of the distributed computational result data that have the profile ID and reporting time in the database, computing a sum of values of the grouped multiple computational results; and an intermediary data storage module, stored in the memory and executable on the at least one processor, to store the database table before the merging the distributed computational result data.

* * * * *